UNITED STATES PATENT OFFICE.

GEORGE A. ENGELHARD, OF NEW YORK, N. Y.

IMPROVEMENT IN VARNISHES.

Specification forming part of Letters Patent No. 27,540, dated March 20, 1860.

*To all whom it may concern:*

Be it known that I, GEORGE AUGUST ENGELHARD, of the city, county, and State of New York, have discovered a new and improved method of using the product of the action of chlorine upon india-rubber, gutta-percha, and kindred vegetable substances when in a state of solution as a varnish; and I do hereby declare that the following is a full and exact description of the process by which such solution is obtained and used as a varnish.

I dissolve coautchouc, gutta-percha, and kindred vegetable substances in one of their well-known solvents, such as chloroform, benzole, chloride of carbon, &c. This solution is brought in contact with chlorine by passing a stream of gaseous chlorine into the same in order to bring said chlorine in immediate contact with the gum contained in the solution. The solution, which is of dark color when first made, turns brighter as the chlorine begins to take effect, and after a certain time it becomes yellow, when the combination of the caoutchouc, gutta-percha, and kindred vegetable substances with the chlorine is perfected. The solvent is now removed by treating the solution with alcohol, which combines with the solvent and causes the new product to precipitate. After removing the solvent the new product is well washed with alcohol, and then dried. This new product, when perfectly dry, is dissolved in chloroform, bisulphuret or carbon, chloride of carbon, benzole, the quantity of which solvents is to be taken proportionate to the desired thinness or thickness of the solution. Any one of these solutions can be used as a varnish upon wood, plaster-of-paris, cotton cloth, especially, however, upon paper, (glued or not,) photographs, ambrotypes, &c. The benzole solution is for practical purposes the best.

I do not claim in this application the treatment of caoutchouc, gutta-percha, and other kindred vegetable substances with chlorine in order to obtain the above-described new product.

I do not claim the solution of said product in the solvents above specified.

What I do claim is—

The use and application of the solution in question as a varnish suitable for wood, plaster-paris, paper, photographs, ambrotypes, and as a varnish upon non-metallic substances.

Dated New York city, February 27, 1860.

GEORGE AUGUST ENGELHARD.

Witnesses:
GUSTAV MILLER,
S. MEINHERR.